US010592006B2

(12) United States Patent
Escolin et al.

(10) Patent No.: US 10,592,006 B2
(45) Date of Patent: Mar. 17, 2020

(54) PATTERN FOR INCREASED COEFFICIENT OF FRICTION OF INPUT DEVICES

(71) Applicant: Microsoft Technology Licensing, LLC, Redmond, WA (US)

(72) Inventors: Timothy Mathew G. Escolin, Seattle, WA (US); Byungkwan Min, Bellevue, WA (US); Joshua C. Grant, Redmond, WA (US); Aashish Nataraja, Redmond, WA (US); Tsang Cheung, Shenzhen (CN)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 15/617,560

(22) Filed: Jun. 8, 2017

(65) Prior Publication Data

US 2018/0203529 A1    Jul. 19, 2018

Related U.S. Application Data

(60) Provisional application No. 62/446,079, filed on Jan. 13, 2017.

(51) Int. Cl.
*G06F 3/0354* (2013.01)
*G06F 3/041* (2006.01)

(52) U.S. Cl.
CPC ........ *G06F 3/0354* (2013.01); *G06F 3/03545* (2013.01)

(58) Field of Classification Search
CPC .. G06F 3/0416; G06F 3/04847; G06F 3/0362; G06F 3/044; G06F 3/0412; G06F 2203/04108; G06F 2203/04804; G06F 3/04845
See application file for complete search history.

(56) References Cited

U.S. PATENT DOCUMENTS

| 5,164,324 | A | 11/1992 | Russell et al. |
| 5,759,473 | A | 6/1998 | Minke et al. |
| 7,975,971 | B2 | 7/2011 | Carnevali |
| 9,321,090 | B2 | 4/2016 | Xia et al. |
| 2006/0173421 | A1 | 8/2006 | Weber et al. |
| 2006/0279540 | A1* | 12/2006 | Stromberg ............ G06F 3/0317 345/157 |

(Continued)

FOREIGN PATENT DOCUMENTS

| JP | H8-30369 A | * | 2/1996 | ............. G06F 3/041 |
| WO | WO-2012165098 A1 | * | 12/2012 | ............. G06F 3/041 |

OTHER PUBLICATIONS

Gachot, et al., "Dry friction between laser-patterned surfaces: Role of alignment, structural wavelength and surface chemistry", In Publication of Tribology Letters, vol. 49, Issue 1, Jan. 2013, pp. 1-20.

(Continued)

*Primary Examiner* — Bryan Earles
(74) *Attorney, Agent, or Firm* — Arent Fox LLP (57) ABSTRACT

Described are examples of an input device for use with a computing device. The input device includes a body having a plurality of surfaces, where the plurality of surfaces include a bottom surface composed of silicone and having a pattern of a plurality of apertures to provide a desired coefficient of friction.

17 Claims, 5 Drawing Sheets

(56) References Cited

U.S. PATENT DOCUMENTS

| | | | |
|---|---|---|---|
| 2008/0224356 A1* | 9/2008 | Taeger | B29C 33/405 |
| | | | 264/400 |
| 2013/0154159 A1 | 6/2013 | Noel et al. | |
| 2014/0111455 A1* | 4/2014 | Niwa | G06F 3/041 |
| | | | 345/173 |
| 2014/0363608 A1 | 12/2014 | Russell-Clarke et al. | |
| 2015/0093977 A1 | 4/2015 | Deopura et al. | |
| 2015/0336326 A1 | 11/2015 | Neu et al. | |
| 2016/0126614 A1* | 5/2016 | Lim | H01Q 1/36 |
| | | | 343/720 |
| 2017/0200881 A1* | 7/2017 | Gdala | G06F 3/044 |
| 2018/0121004 A1* | 5/2018 | Xu | F21V 3/00 |

OTHER PUBLICATIONS

Dunn, et al., "Nanosecond laser texturing for high friction applications", In Journal of Optics and Lasers in Engineering, vol. 62, Nov. 2014, pp. 10-16.

* cited by examiner

PATTERN FOR INCREASED COEFFICIENT OF FRICTION OF INPUT DEVICES

CLAIM OF PRIORITY UNDER 35 U.S.C. § 119

The present Application for Patent claims priority to Provisional Application No. 62/446,079, entitled "PATTERN FOR INCREASED COEFFICIENT OF FRICTION OF INPUT DEVICES" filed Jan. 13, 2017, which is assigned to the assignee hereof and hereby expressly incorporated by reference herein for all purposes.

BACKGROUND

Use of computing devices is becoming more ubiquitous by the day. Computing devices range from standard desktop computers to wearable computing technology and beyond. One area of computing devices that has grown in recent years is in tablet and hybrid computers. Hybrid computers may act as a tablet computer or a laptop computer, and may include input devices that may be coupled to or separated from (e.g., removably attached to) a display portion, where the display portion may also include other components that facilitate operation of the computer (e.g., processor, memory, etc.). The tablet and/or hybrid computers may utilize one or more input devices to provide user input to the computers.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an example, an input device for use with a computing device. The input device includes a body having a plurality of surfaces. The plurality of surfaces include a bottom surface composed of silicone and having a pattern of a plurality of apertures to provide a desired coefficient of friction (CoF).

In another example, a method for constructing an input device for a computing device is provided. The method includes assembling at least a portion of a body of the input device including at least one silicone bottom surface, and applying a pattern of a plurality of apertures to the at least one silicone bottom surface, where the plurality of apertures to achieve a desired CoF.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known components are shown in block diagram form in order to avoid obscuring such concepts.

This disclosure describes various examples of an input device for a computing device that is configured to be placed on a display of the computer to facilitate receiving user input. In an example, the input device may interact with the computing device to cause a graphical user interface of one or more menu options or other interfaces on the computing device to be displayed. Further interaction with the one or more menu options or the input device itself may be possible to effect functions on the computing device. In some cases, the input device may be placed on a display of the computing device, where the display may have a relatively slippery surface (e.g., a glass or a glass-like material and/or a protective layer on the surface. Correspondingly, as described herein, a surface of the input device contacting the display may desirably have a coefficient of friction (CoF) within a certain range to prevent inadvertent movement of the input device while also making the input device moveable over the display without excessive force. For instance, an example of a suitable CoF for the surface of the input device that contacts the display may be, but is not limited to, a CoF in the range of 2.0-4.0. To achieve this CoF, a surface of the input device that contacts the display (e.g., a bottom surface) may include a silicone material having a pattern, which may be laser etched, to achieve the CoF.

In an example, the silicone bottom surface of the input device may be laser patterned to include a plurality of apertures that increase the CoF of the silicone surface. For example, the plurality of apertures may be laser patterned to have a length or diameter in the range of around 15-100 micrometers (μm), and a depth in the range of around 1-10 μm. Additionally, the plurality of apertures may be spaced apart in the range of 10-60 μm. Moreover, for example, the plurality of apertures may be laser patterned in a grid-like pattern. In another example, the silicone bottom surface may include two or more area, where each area may have a different laser patterning to achieve the desired CoF. For example, the silicone bottom surface may have one or more concentric areas that may be defined by laser etching a first pattern on the entire silicone bottom surface, and laser etching the one or more concentric areas using a second pattern.

Figure 2:
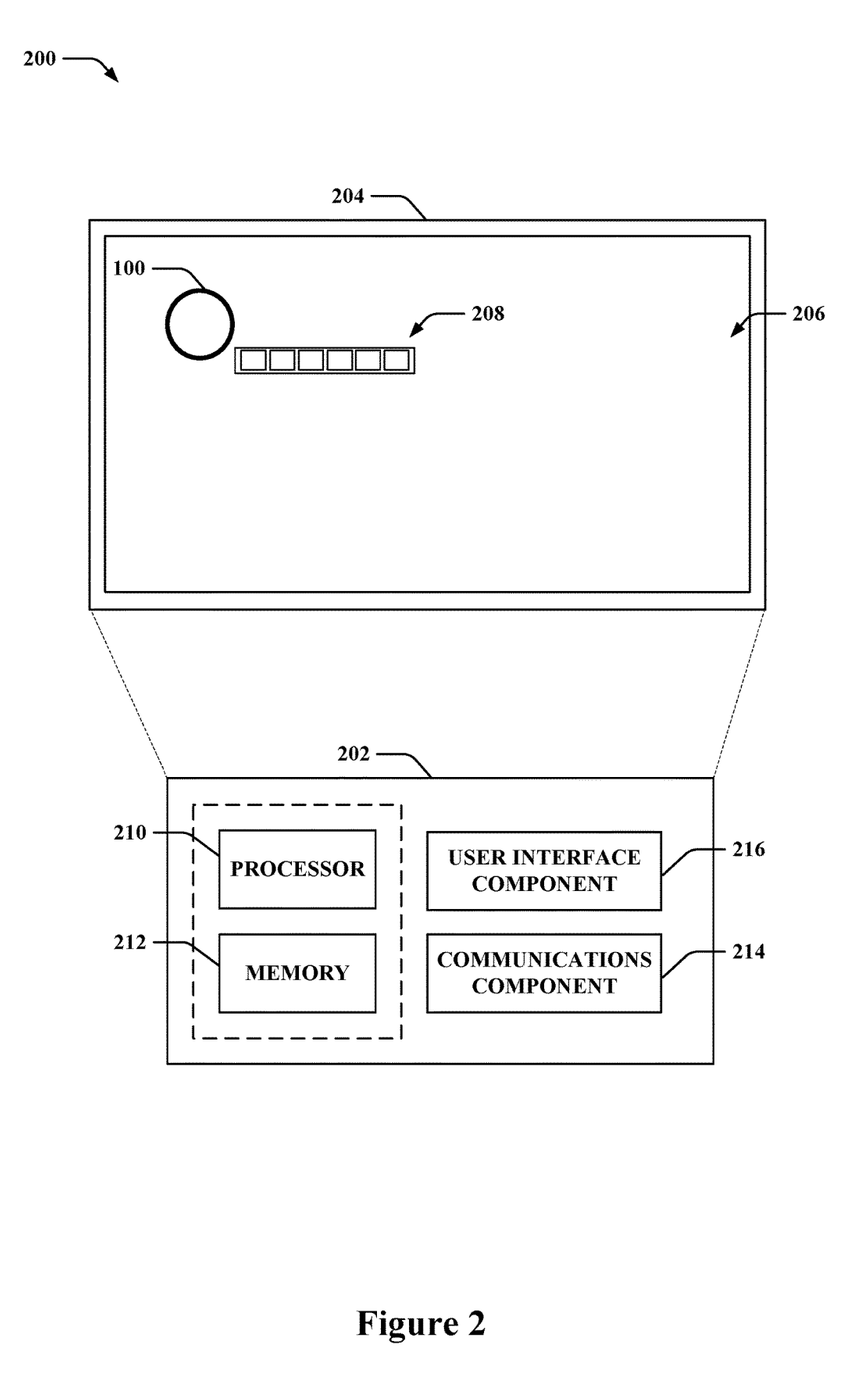
FIG. 2 is a schematic of an example of a computing device that supports utilizing the input device.
Figure 3:
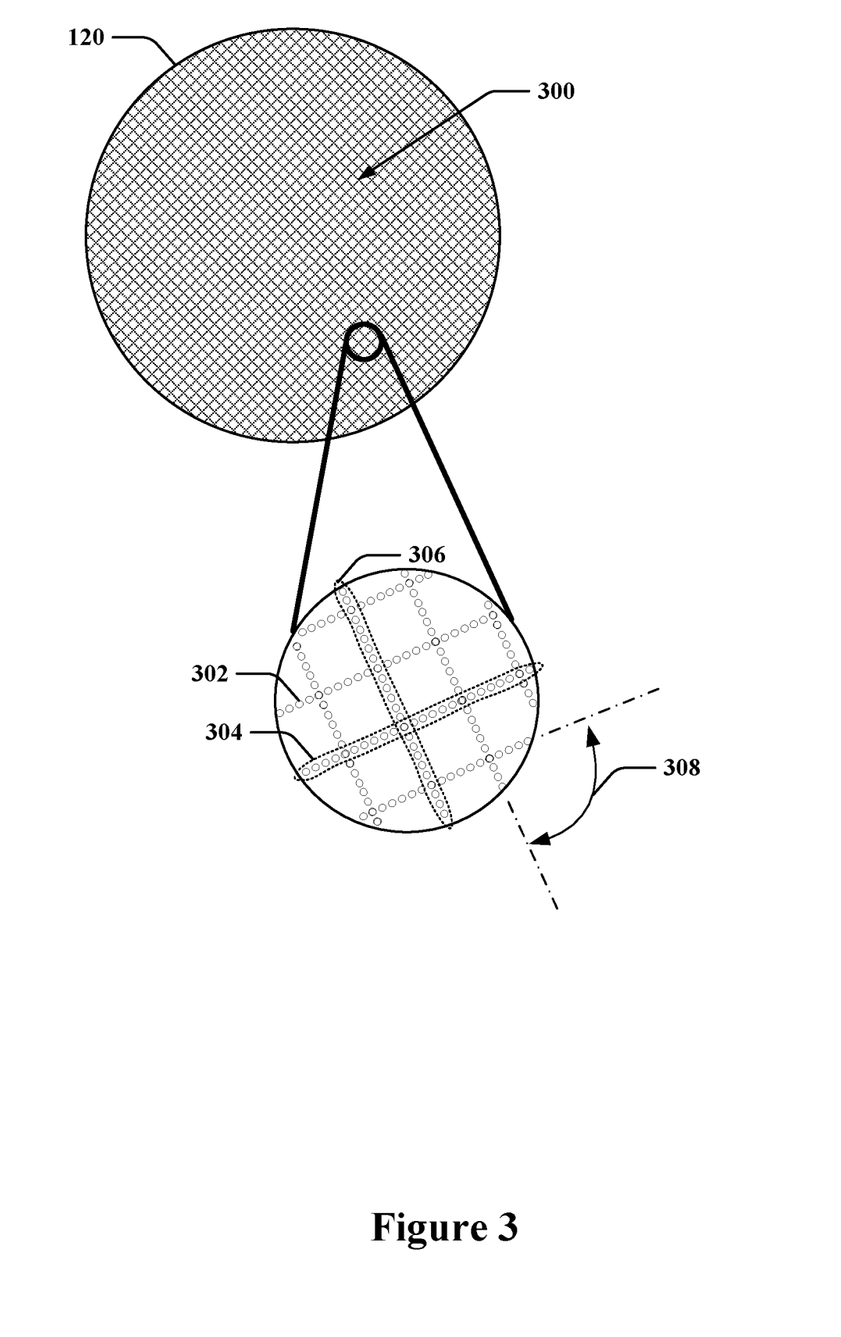
FIG. 3 is a plan view of an example of a bottom surface of an input device for a computing device.
Figure 4:
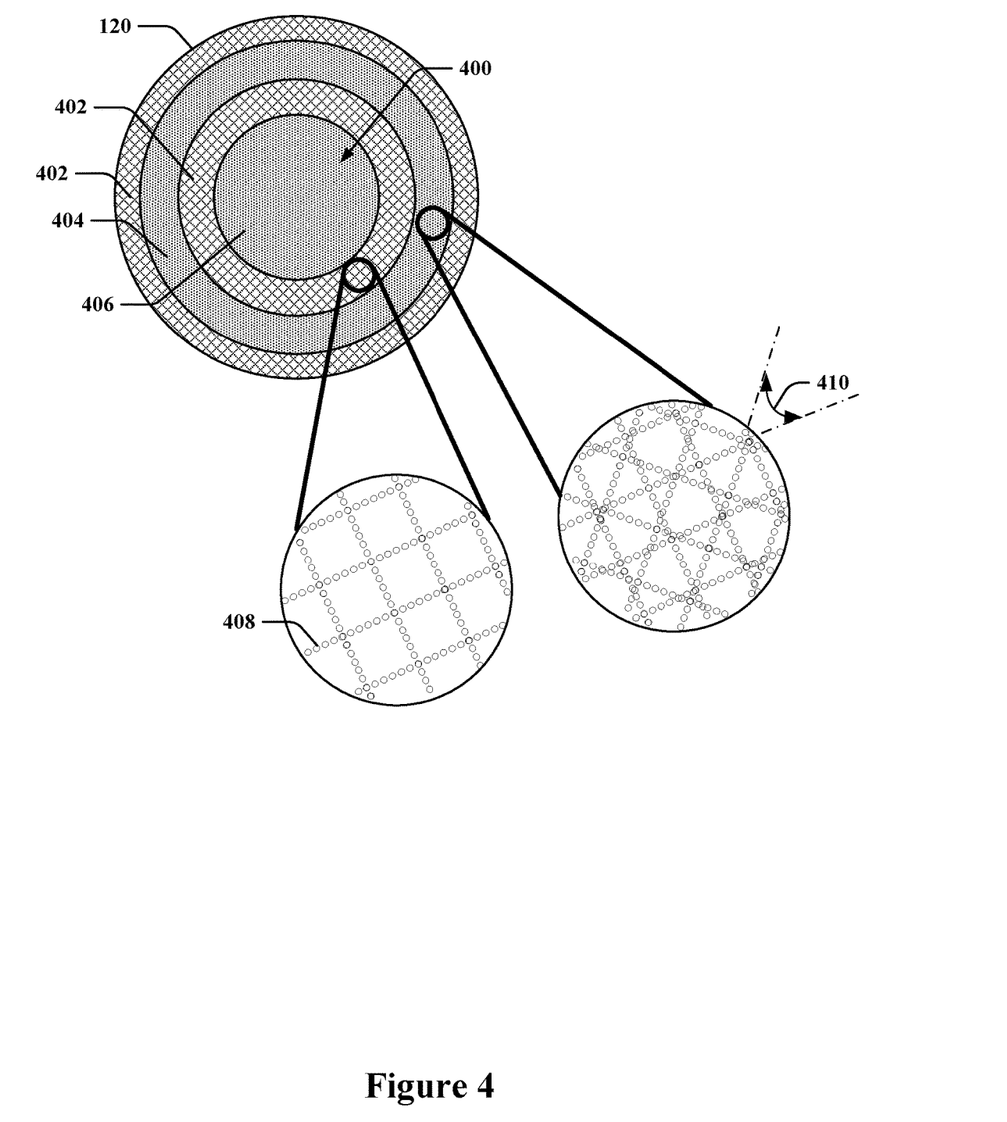
FIG. 4 is a plan view of an example of a bottom surface of an input device having multiple concentric portions for a computing device.

Turning now to FIGS. 1-4, examples are depicted with reference to one or more components and one or more methods that may perform the actions or operations described herein, where components and/or actions/operations in dashed line may be optional. Although the operations described below in FIG. 4 are presented in a particular order, the ordering of the actions and the components performing the actions may be varied, in some examples, depending on the implementation. Moreover, in some examples, one or more of the actions, functions, and/or described components may be performed by a specially-programmed processor, a processor executing specially-programmed software or computer-readable media, or by any other combination of a hardware component and/or a software component capable of performing the described actions or functions.

Figure 1:
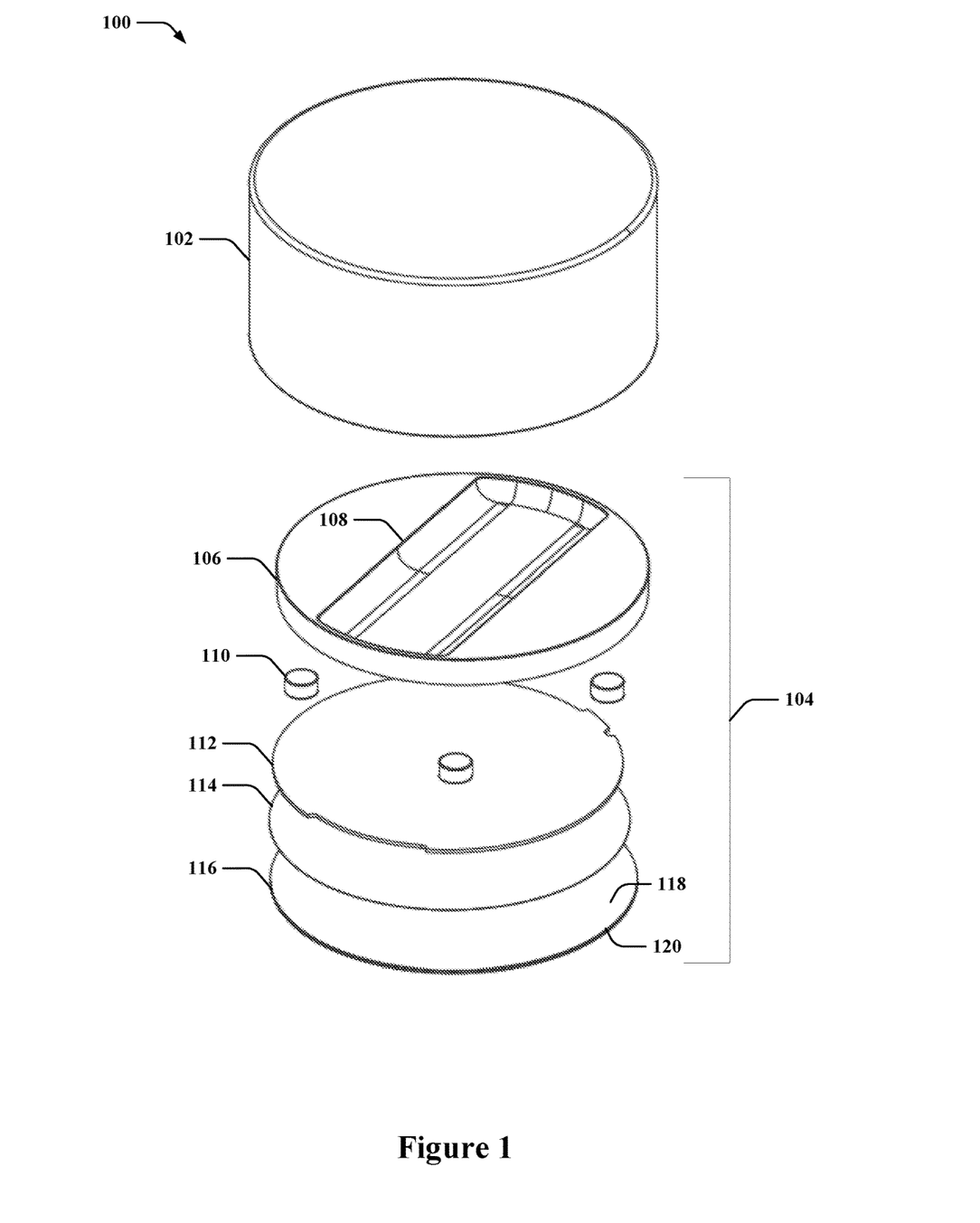
FIG. 1 is an exploded perspective view of an example input device for a computing device.

Referring to FIGS. 1 and 2, an example of an input device 100 includes multiple parts for enabling the input device 100 to interact and communicate with a computing device 200. In an example, the input device 100 can be used to interact with a display 204 of the computing device 200, which can be a touch screen display. For example, the input device 100 may be placed on the display 204 (e.g., over a display area 206 of the display 204). The processing portion 202 (e.g., via processor 210, memory 212, etc.) may detect placement, contact, of the input device 100 on the display 204 or display area 206 (or other interaction, such as receiving an input from the input device 100, which may include receiving a signal from the input device 100 indicating an interaction with the input device 100, such as a button press by the user), and may accordingly cause generation of one or more graphical user interfaces 208 on the display area 206 of the computing device 200. For example, the one or more interfaces 208 can allow for further user interaction via at least one of engaging the input device 100, touching the display 204, etc.

Input device 100 may include a top body portion 102, such as an outer housing, which may house one or more electronic components (not shown; e.g., processor, memory) of the input device 100 for processing one or more engagements of one or more portions of the input device 100 (e.g., touching of the input device 100, pressing of a button of the input device 100, movement of the input device 100, etc.).

Input device 100 may include a bottom body portion 104, which may include a cover portion 106 sized to fit within and/or to cover a bottom opening of the top body portion 102. In an example, cover portion 106 may cover a battery compartment of the input device 100, and may define an aperture 108 to allow for placement of a battery within the input device 100 to be covered by cover portion 106. Additionally, the bottom body portion 104 may include a plurality of magnets 110, which may be secured within corresponding recesses in the cover portion 106, for generating a magnetic force to help the input device 100 contact the display 204 of the computing device 200. Also, the bottom body portion 104 may include an adhesive layer 112, such as a heat activated film or other adhesive material, for affixing a digitizer layer 114 to the cover portion 106. For example, the digitizer layer 114 may include a printed circuit board (PCB) for interacting with the display of the computing device, detecting movement or contact of a bottom layer 116 of input device 100, etc. In an example, the digitizer layer 114 may include one or more traces (not shown), which may be concentric circles in the digitizer layer 114 formed of pieces of copper or other metal for detecting interaction between the one or more traces and other portions of the computing device 200. For example, the digitizer layer 114 may digitize electronic signals corresponding to the detected interactions.

The bottom body portion 104 may also include the bottom layer 116, which can at least partially cover the digitizer layer 114. The bottom layer 116 may include a top surface 118 attachable to the digitizer layer 114 and a bottom surface 120 that can be composed of a silicone or other elastomeric material. In one example, the bottom layer 116 may include a substrate layer coated in silicone, such as a polyethylene terephthalate (PET) substrate compression-molded in silicone.

In an example, cover portion 106, magnets 110, adhesive layer 112, digitizer layer 114, and bottom layer 116 can be pressed together to form the bottom body portion 104. In an example, bottom body portion 104 can be removably attachable to the top body portion 102 to allow for battery replacement, replacement of the bottom body portion 104, etc.

As the input device 100 can interact with the display of the computing device, it may be desirable for the bottom surface 120, which may be placed so as to contact the display 204 of the computing device 200, to have a certain CoF. For example, a CoF in the range of 2.0-3.0 may allow the input device 100 to remain in a position on a surface of the display 204 of the computing device 200 (e.g., a glass surface or a protective coating on a glass surface of the display 204), such as when the surface of the display 204 is positioned at an angle relative to horizontal and/or when the computing device 200 may be moved. Additionally, a CoF in this range may provide a desirable counter-force when moving the input device 100 across the display 204 of the computing device 200. In this regard, for example, the bottom surface 120 (e.g., the bottom surface 120 that is exposed from the bottom body portion 104 once assembled) can be laser patterned with one or more patterns to achieve a desired CoF of the bottom layer 116 when contacting a surface of a display, such as glass.

As described, display 204 can include and/or can be coupled to a separable or non-separable processing portion 202 of the computing device 200, which may house or otherwise include a processor 210, memory 212, communications component 214, user interface component 216, etc. In an example, computing device 200 can include additional optional component details as those shown in FIG. 2. In one example, computing device 200 may include processor 210 for carrying out processing functions associated with one or more of components and functions described herein. Processor 210 can include a single or multiple set of processors or multi-core processors. Moreover, processor 210 can be implemented as an integrated processing system and/or a distributed processing system.

Computing device 200 may further include memory 212, such as for storing local versions of applications being executed by processor 210, related instructions, parameters, etc. Memory 212 can include a type of memory usable by a computer, such as random access memory (RAM), read only memory (ROM), tapes, magnetic discs, optical discs, volatile memory, non-volatile memory, and any combination thereof. Additionally, processor 210 and memory 212 may include and execute instructions for operating display 204, receiving touch input from display 204 (e.g., in the form of user finger touch, touch from an input device 100, etc.), receiving input from an input device 100, providing output on display 204 (or display area 206) corresponding to the input from input device 100, etc.

Further, computing device 200 may include a communications component 214 that provides for establishing and maintaining communications with one or more other devices, parties, entities, etc. utilizing hardware, software, and services as described herein. Communications component 214 may carry communications between components on computing device 200, as well as between computing device 200 and external devices, such as devices located across a communications network and/or devices serially or locally connected to computing device 200. For example, communications component 214 may include one or more buses, and may further include transmit chain components and receive chain components associated with a wireless or wired transmitter and receiver, respectively, operable for interfacing with external devices.

Computing device 200 may also include a user interface component 216 operable to receive inputs from a user of computing device 200 and further operable to generate outputs for presentation to the user (e.g., via display 204). User interface component 216 may include one or more input devices, including but not limited to a touch-sensitive portion of display 204, a keyboard, a number pad, a mouse, a navigation key, a function key, a microphone, a voice recognition component, a gesture recognition component, a depth sensor, a gaze tracking sensor, any other mechanism capable of receiving an input from a user, or any combination thereof. Further, user interface component 216 may include one or more output devices, including but not limited to a display interface for operating display 204, a speaker, a haptic feedback mechanism, a printer, any other mechanism capable of presenting an output to a user, or any combination thereof.

Referring to FIG. 3, a bottom surface 300 can be one example of bottom surface 120 of a bottom layer 116 of the input device 100. For example, bottom surface 300 can include a silicone material that is laser etched with a pattern of a plurality of apertures 302. The silicone material, for instance, may be of a thickness around 0.1-1.0 mm or any suitable thickness. For example, the plurality of apertures 302 can be configured in a grid, and each aperture may have a diameter in a range of 15-100 micrometers (μm), and a depth (e.g., a distance into the silicone material from the bottom surface 300) in a range of 1-10 μm (e.g., 0.1-1.0% of the silicone material thickness). Additionally, for example, apertures in a given line 304, 306 of the grid may be spaced apart in the range of 10-60 μm. The lines 304, 306 of the grid formed by the plurality of apertures 302 may be spaced apart in the range of 300-500 μm. For example, the grid pattern can be created by applying a laser to the silicone material of the bottom surface 300 to create parallel lines 304 of apertures 302 at a first rotational angle respective to the bottom surface 300 (e.g., spaced apart in the range of 300-500 μm where the lines include apertures that are spaced apart in the range of 10-60 μm and have a diameter in the range of 15-100 μm and a depth in the range of 1-10 μm), and then applying the laser to create similar parallel lines 306 of apertures 302 at a second rotational angle, which may be a rotational offset 308 from the first rotational angle. In an implementation, for instance, the rotational offset 308 may be, but is not limited to, a substantially 90 degree offset. In an example, when the bottom surface 300 with this pattern contacts a glass surface, the CoF can be around 2.16.

In one example, laser patterning can be applied to the silicone material of the bottom surface 300 at a speed of 2000 millimeters per second, a frequency of 30 kilohertz, a pulse width of 1%, and a line distance of 0.45 millimeters to achieve the pattern described above. In addition, for example, laser patterning can be applied over a sheet of silicone, which can be stamped using a dye to cut the silicone material of the bottom surface 300. In another example, the silicone can be stamped and applied to another substrate or layer to form the bottom layer 116 including bottom surface 300, which can then be laser patterned, as described above, when fixed together, when assembled as bottom body portion 104, and/or when assembled as input device 100.

Referring to FIG. 4, bottom surface 400 can be another example of bottom surface 120 of a bottom layer 116 of the input device 100. For example, bottom surface 400 can include a silicone material that is laser patterned to provide a desired CoF. For example, bottom surface 400 can include one or more first areas 402 and one or more second areas, such as areas 404 and 406. In this example, the one or more areas 402, 404, and 406 can be concentric. For instance, each of the two areas 402 and area 404 may be circular rings positioned adjacent to one another and surrounding area 406, which may be a central circular area. In an example, the second areas 404, 406 may cover similar areas of the digitizer layer 114. For example, the digitizer layer 114 may include a plurality of traces (e.g., pieces of copper or other metal for processing inputs related to the input device), and the second areas 404, 406 may include additional silicone layers to cover the traces.

Moreover, for example, the one or more first areas 402 and at least one of the second areas 404 or 406 can be positioned in different relative configurations and can have different laser patterning to provide additional or different CoF for the bottom surface 400. In one example, the areas 402, 404, 406 can be formed on a single silicone layer having the bottom surface 400, but may have different laser patterns. Moreover, the areas 402, 404, 406 can be formed by applying a first pattern to an entire area of the bottom surface, and then applying one or more additional patterns to selected areas (e.g., areas 404 and 406) within the entire area of the bottom surface. Alternatively, the areas 402, 404, 406 can be formed from different pieces of silicone and assembled to form the bottom surface 400.

In an example, the laser patterning of the one or more second areas 404, 406 may include the laser pattern of the first area 402. In this regard, for example, the first area 402 and second area(s) 404, 406 can be laser patterned according to a first pattern, which may be similar to the grid pattern described above with respect to bottom surface 300 in FIG. 3, having similar apertures 408 as apertures 302 described in FIG. 3. Then, in this example, the second area(s) 404, 406 can be laser patterned according to a second pattern as well. In the depicted example, the second pattern can be similar to the first pattern but offset by a rotational angle, e.g., rotational offset 410, which can be in a range of 30-60 degrees (e.g., about 45 degrees in the example in FIG. 4).

In other examples, however, the first area 402 and second area(s) 404, 406 can be separately patterned. In one example, the second area(s) 404, 406 can be separately laser patterned on a sheet of silicone, and then stamped and affixed to the first area 402. In an example, when the bottom surface 400 with this laser pattern, which varies for concentric areas of the surface, contacts a glass surface, the CoF can be around 2.70.

Figure 5:
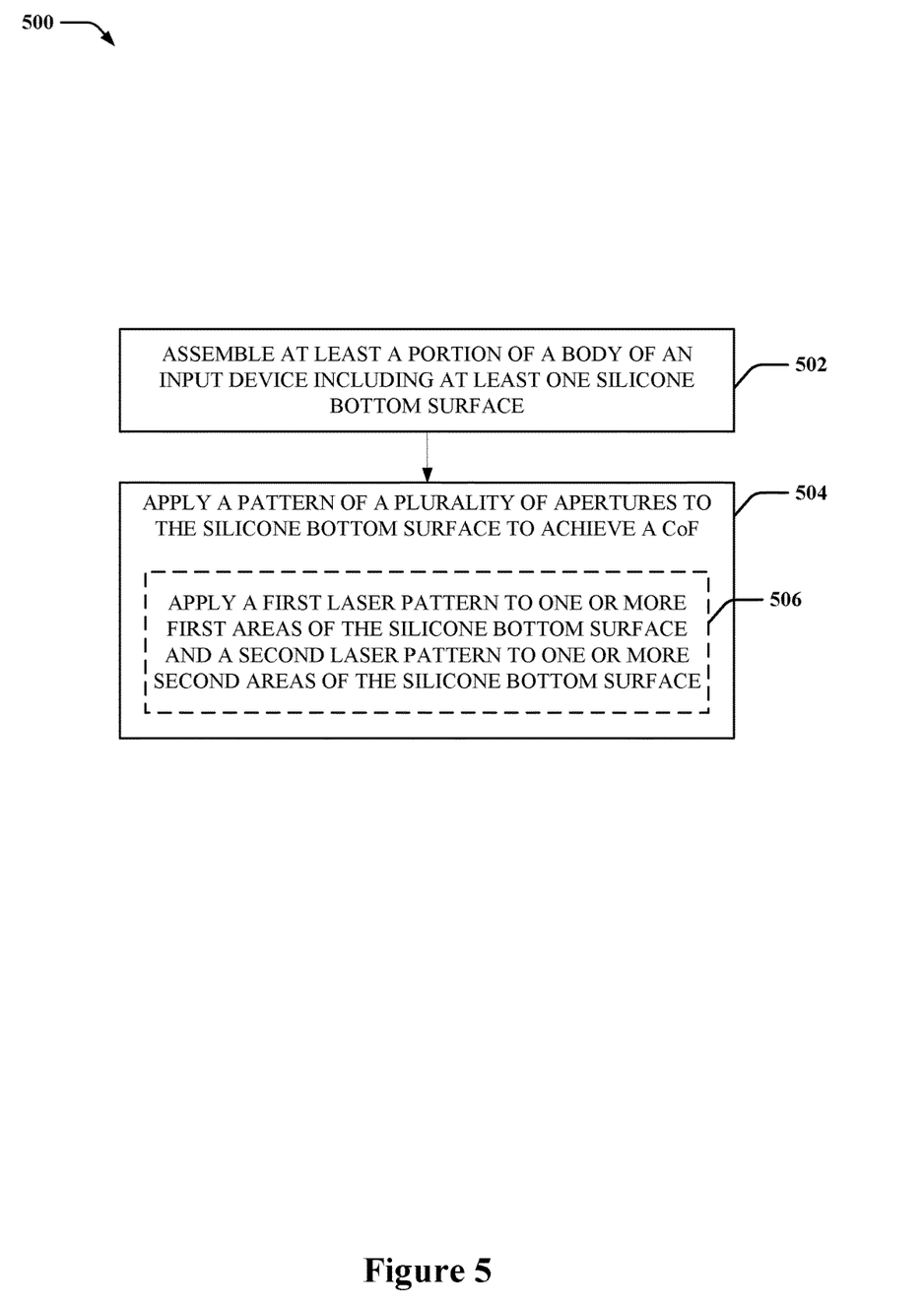
FIG. 5 is a flow diagram of an example of a method for constructing an input device.

Referring to FIG. 5, an example of a method 500 for applying a laser pattern to a silicone surface of an input device may be utilized to form a bottom surface of a bottom layer of the input device, which may achieve a CoF to allow the input device to remain positioned, but still be easy movable, on a surface of a display of a computer device. For example, method 500 can be performed by one or more devices for forming or manufacturing portions, layers, etc., of the input device, which may include one or more material fabrication devices, etc.

In method 500, at action 502, at least a portion of a body of an input device including at least one silicone bottom surface can be assembled. For example, this can include assembling at least a bottom body portion of the input device, such as bottom body portion 104 in FIG. 1. In an example, assembling the bottom body portion can include pressing together multiple portions, layers, etc. as described in FIG. 1, such as a cover portion, one or more magnets, an adhesive layer, a digitizer layer, a bottom layer having a bottom surface, etc., where the bottom body portion can include the silicone surface as the bottom surface.

In method 500, at action 504, a pattern of a plurality of apertures can be applied to the silicone bottom surface to achieve a CoF. For example, applying the laser pattern can include applying one or more of the patterns described in FIGS. 3 and 4 to the silicone surface (e.g., using a laser to form a laser pattern of apertures).

In addition, in an example, applying the laser pattern at action 504 may optionally include, at action 506, applying a first pattern to one or more first areas of the silicone bottom surface (which may include an entirety of the surface) and a second laser pattern to one or more second areas of the silicone bottom surface (which may include one or more selected areas within the entirety of the bottom surface). Thus, for example as described in FIG. 4, the silicone bottom surface can have multiple areas, where each area may have a different laser pattern. In one example, a first laser pattern can be applied over all of the area of the bottom surface, and a second laser pattern can be applied over the one or more second areas such that the one or more second areas have both laser patterns applied. Additionally, as described, the actions in method 500 can occur in any order, and thus the laser pattern can be applied to the silicone bottom surface (e.g., at action 506) before or after assembling the bottom layer 116 to the bottom body portion 104 (e.g. at action 502). In an example, applying the laser pattern can include applying the laser pattern to a silicone sheet, where the laser-patterned silicone sheet can be stamped and pressed onto the bottom layer 116 of the bottom body portion 104.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more aspects, one or more of the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described herein that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. An input device for use with a computing device, comprising:
a body having a plurality of surfaces, wherein the plurality of surfaces include a bottom surface having a pattern of a plurality of apertures having a diameter in a range of 15-100 micrometers (μm), and a depth in a range of 1-10 μm,
wherein the bottom surface includes two or more areas, wherein at least a first one of the two or more areas is patterned with the plurality of apertures in a first pattern, and wherein at least a second one of the two or more areas is patterned with a second plurality of apertures in a second pattern, the second pattern providing an increased coefficient of friction as compared to the first pattern.

2. The input device of claim 1, wherein the plurality of apertures are laser etched in a grid pattern on the bottom surface and spaced apart in the range of 10-60 μm.

3. The input device of claim 1, wherein the second one of the two or more areas is additionally patterned with the plurality of apertures in the first pattern.

4. The input device of claim 1, wherein at least the second one of the two or more areas includes a concentric portion of the first one of the two or more areas.

5. The input device of claim 4, wherein the bottom surface has a circular area, and wherein at least the second one of the two or more areas includes a plurality of concentric portions, including the concentric portion, within the circular area.

6. The input device of claim 1, further comprising a digitizer layer for digitizing electronic signals of one or more traces, wherein at least one of the two or more areas are configured to cover the one or more traces.

7. The input device of claim 1, wherein the body houses one or more electronic components of the input device.

8. The input device of claim 1, wherein the body comprises a removable battery cover for the input device, and wherein the bottom surface is attached to the removable battery cover.

9. A computing device, comprising:

a display portion;

a processing portion for operating the display portion, wherein the processing portion includes at least one processor and a memory configured to display one or more user interfaces via the display portion; and an input device having a plurality of surfaces, wherein the plurality of surfaces include a bottom surface having a pattern of a plurality of apertures having a diameter in a range of 15-100 micrometers (μm), and a depth in a range of 1-10 μm, wherein the bottom surface includes two or more areas, wherein at least a first one of the two or more areas is patterned with the plurality of apertures in a first pattern, and wherein at least a second one of the two or more areas is patterned with a second plurality of apertures in a second pattern, the second pattern providing an increased coefficient of friction as compared to the first pattern, wherein the at least one processor and the memory are configured to display the one or more user interfaces via the display portion in response to receiving an input from the input device.

10. The input device of claim 1, wherein the first pattern is a grid pattern, and the second pattern is the grid pattern rotated by an angle.

11. The input device of claim 10, wherein the angle is in a range of 30-60 degrees.

12. The computing device of claim 9, wherein the plurality of apertures are laser etched in a grid pattern on the bottom surface and spaced apart in the range of 10-60 μm.

13. The computing device of claim 9, wherein the first pattern is a grid pattern, and the second pattern is the grid pattern rotated by an angle.

14. The computing device of claim 13, wherein the angle is in a range of 30-60 degrees.

15. The computing device of claim 9, wherein the second one of the two or more areas is additionally patterned with the plurality of apertures in the first pattern.

16. The computing device of claim 9, wherein at least the second one of the two or more areas includes a concentric portion of the first one of the two or more areas.

17. The computing device of claim 16, wherein the bottom surface has a circular area, and wherein at least the second one of the two or more areas includes a plurality of concentric portions, including the concentric portion, within the circular area.

* * * * *